(12) United States Patent
Hardeberg

(10) Patent No.: US 6,728,401 B1
(45) Date of Patent: Apr. 27, 2004

(54) RED-EYE REMOVAL USING COLOR IMAGE PROCESSING

(75) Inventor: Jon Y. Hardeberg, Bellevue, WA (US)

(73) Assignee: Viewahead Technology, Redmond, WA (US)

( * ) Notice: Subject to any disclaimer, the term of this patent is extended or adjusted under 35 U.S.C. 154(b) by 667 days.

(21) Appl. No.: 09/641,406

(22) Filed: Aug. 17, 2000

(51) Int. Cl.$^7$ .................................................. B06K 9/00
(52) U.S. Cl. ....................... 382/167; 382/117; 348/370; 348/576
(58) Field of Search ................................ 382/115–120; 348/370–371, 376–577

(56) References Cited

U.S. PATENT DOCUMENTS

| | | |
|---|---|---|
| 4,644,585 A | 2/1987 | Crimmins et al. |
| 4,725,966 A | 2/1988 | Darby et al. |
| 5,130,789 A | 7/1992 | Dobbs et al. |
| 5,134,668 A | 7/1992 | Appel |
| 5,231,674 A | 7/1993 | Cleveland et al. |
| 5,432,863 A | 7/1995 | Benati et al. |
| 5,432,866 A | 7/1995 | Sakamoto |
| 5,528,703 A | 6/1996 | Lee |
| 5,559,903 A | 9/1996 | Krabbenhoeft |
| 5,710,842 A | 1/1998 | Lee |
| 5,748,764 A | 5/1998 | Benati et al. |
| 5,805,720 A | 9/1998 | Suenaga et al. |
| 5,805,745 A | 9/1998 | Graf |
| 5,912,994 A | 6/1999 | Norton |
| 5,915,044 A | 6/1999 | Gardos et al. |
| 5,990,901 A | 11/1999 | Lawton et al. |
| 5,990,973 A | 11/1999 | Sakamoto |
| 6,009,209 A | 12/1999 | Acker et al. |
| 6,016,354 A | 1/2000 | Lin et al. |
| 6,134,339 A * | 10/2000 | Luo ............................ 382/115 |
| 6,278,491 B1 * | 8/2001 | Wang et al. ................. 348/370 |
| 6,285,410 B1 * | 9/2001 | Marni ......................... 348/576 |
| 6,292,574 B1 * | 9/2001 | Schildkraut et al. ........ 382/177 |
| 6,407,777 B1 * | 6/2002 | Deluca ........................ 348/576 |

FOREIGN PATENT DOCUMENTS

JP      2000013680 A  *  1/2000           H04N/5/262

OTHER PUBLICATIONS

Rafael C. Gonzalez & Richard E. Woods, "Digital Image Processing," Chpt. 8 Representation and Description. Addison–Wesley Publishing, Inc., p. 483–579.

* cited by examiner

Primary Examiner—Jingge Wu
(74) Attorney, Agent, or Firm—Christopher J. Rourk; Akin Gump Strauss Hauer & Feld, LLP (57) ABSTRACT

A color processing system is provided that corrects color artifacts such as red eye typically formed in images from a camera flash. An image is captured or processed by inputting the image into the system. To correct red eye artifacts, a "redness" mask is computed by calculating the colorimetric distance, in an approximately perceptually linear color space, between a prototypical reference "red eye" color and each pixel of the image, or a selected portion thereof, containing the red eye. Each pixel of the redness mask is then reduced to one of two values by comparing the calculated colorimetric distance recorded by each mask pixel to a threshold value. Various filtering, morphological, and blob analysis techniques may be applied to the mask to eliminate noise, reduce errors, and facilitate a more natural look. The mask serves to identify pixels in the color image needing correction, and further serves to identify the amount of correction needed. Pixels identified as having red-eye artifacts are modified to a substantially monochrome color. The bright, substantially white, specular reflection of the eye, however, is preserved.

17 Claims, 12 Drawing Sheets

RED-EYE REMOVAL USING COLOR IMAGE PROCESSING

BACKGROUND OF THE INVENTION

1. Field of the Invention

The invention relates in general to color image processing, and in particular to a system for correcting artifacts in a color image, such as the red eye created by camera flashes.

2. Related Art

Red-eye artifacts are a well-known problem in photography. Red-eye artifacts are caused by light entering a subject's eye through the pupil, reflecting off the retina at the back of the eye, and traveling back through the pupil toward the camera lens. The light typically comes from a flash attached to the camera taking the photograph. The reflection is red because the retina absorbs non-reddish components of the light entering the eye.

Several systems or methods have been proposed or attempted to reduce the problem of red-eye artifacts at the time the photograph is taken. One commonly known technique is to increase the distance between the flash and the lens. Although a substantially equal amount of light is reflected, less of the light is reflected toward the lens. Another common technique is to take several pre-flashes to reduce the size of the subject's pupils. These solutions, however, are not satisfactory because red-eye artifacts, although usually less pronounced, typically remain. Also, increasing the distance between the flash and the lens generally requires a less compact and less user-friendly camera. Furthermore, pictures taken with multiple pre-flashes consume more power than those taken with a single flash and require more time to take a picture. Therefore, red-eye artifacts continue to be a significant problem in amateur photography.

Various digital processing techniques have been created in an effort to remove red-eye artifacts from photographs in post-image capture processing. Such packages include Microfrontier's ™ Digital Dark Room™, Photodex's ™ CompPic™, Microsoft's ™ PhotoDraw™, Adobe'™ PhotoDeluxe™, and Corel's™ CorelScan™, which use techniques for removing red eye with varying, but often less than satisfactory, success.

A need exists to remove the red-eye without removing the specular reflection of the flash, because the specular reflection is often a desirable feature of the image. A need also exists to make red-eye removal appear more natural. Some prior art techniques fail to eliminate all of the red eye, make the pupil look unnaturally large, leave unnatural-looking red-fringes around the pupil, or make the transition between the pupil and the surrounding iris look too abrupt.

SUMMARY

A system of correcting artifacts of a color image is provided where image capture circuitry captures the color image and image processing circuitry identifies and corrects artifacts in the color image. To identify the artifact, the image processing circuitry compares all or a part of the color image to at least one reference color characteristic. To correct the artifact, which has a plurality of color characteristics, the image processing circuitry modifies at least one of the color characteristics of the artifact. This modification process reduces the color saturation of red-eye artifacts to at or near zero, obtaining an achromatic appearance of the pupil.

The invention also provides a system for identifying artifacts by computing a color difference mask of at least a portion of the image containing the artifact. The color difference mask is computed by calculating, for each pixel of the portion of the image being analyzed, the colorimetric distances between the color of the pixel and a predefined typical artifact color. Additional systems provide enhancement of the red-eye artifact identification process by reducing each pixel of the mask to one of two values based on a comparison with a threshold value, and by filtering and adjusting the mask.

Another system provides converting the identified red-eye portions of an image to a substantially monochrome color that accommodates the fact that the pupil of the eye is substantially black. The bright, substantially white, specular reflection of the eye is preserved by keeping the luminance of the corrected pixels substantially unchanged.

The invention also improves the artifact-detecting and correcting functionality of the color difference mask by applying morphological filtering and blob analysis operations on the mask. Image appearance is further improved by tapering the color correction process near the perimeter of the red-eye artifact.

This invention is useful not only for detecting and correcting red-eye artifacts, but also for detecting different-colored retina-reflection artifacts, such as the green-eye and gold-eye artifacts that can result from taking pictures of various animals. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principals of the invention. Moreover, in the figures, like reference numerals designate corresponding parts throughout the different views.

DETAILED DESCRIPTION

Figure 1:
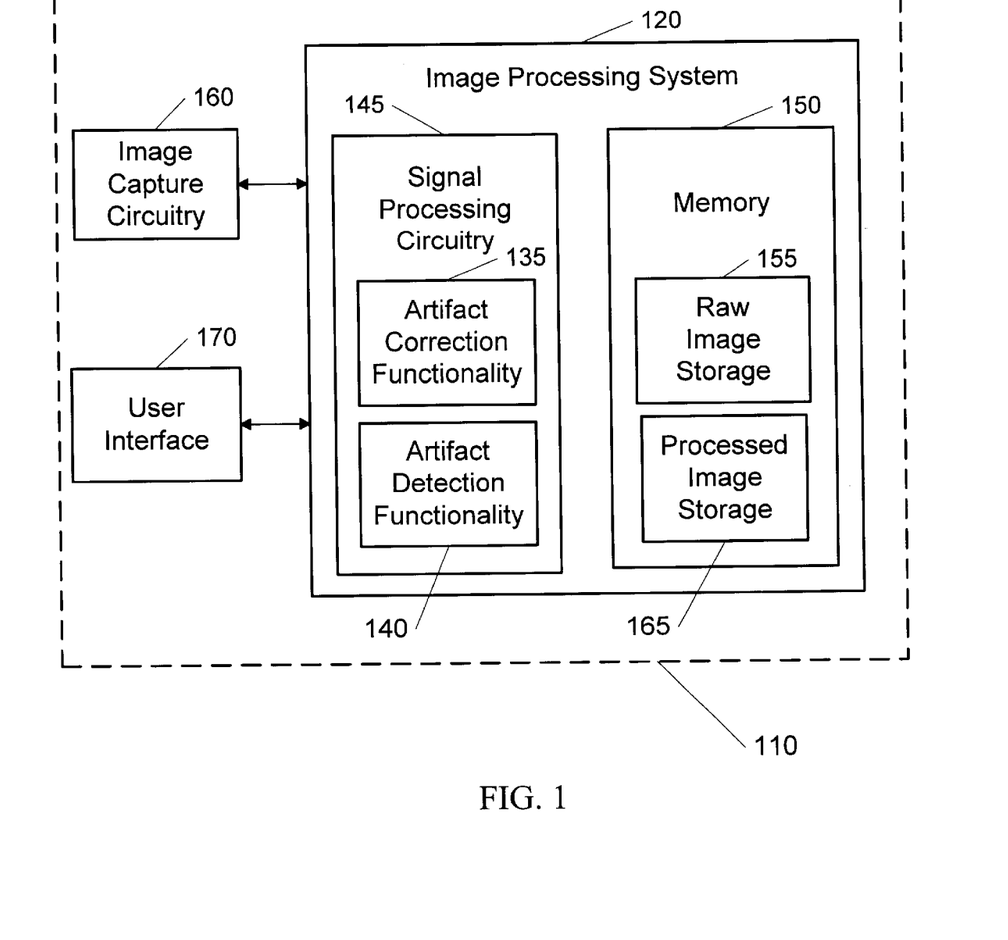
FIG. 1 is a block diagram of an artifact correction system.

FIG. 1 is a functional block diagram of an artifact correction system 110 that corrects an artifact in a color image. The illustrated artifact correction system 110 is shown having image capture circuitry 160, a user interface 170, and an image processing system 120. The image capture circuitry 160 captures the color image and converts it to a digital format for the image processing system 120. Alternatively, the image capture circuitry 160 delivers a color image to the image processing system 120 in analog format, to be converted to digital format by the image processing system 120.

The image processing system 120 is provided having signal processing circuitry 145 and memory 150 for raw image storage 155 and processed image storage 165. The image processing system 120 receives the color image from the image capture circuitry 160, through a direct physical link such as an integrated circuit, cable, or network connection, an indirect physical link, such as a floppy disk or other removable memory storage device, or through a remote link, such as a wireless transmitter and receiver.

The color image may contain one or more artifacts of a given type, such as the red-eye artifact caused by absorption of visible light by the retina of an eye. The artifact has one or more typical color characteristics—such as luminance, hue, or saturation. For example, flash-induced red-eye artifacts in color photographs have a typical hue and color saturation.

The signal processing circuitry 145 carries out certain artifact detection and artifact correction functions 135 and 140 on the color image. To detect the artifact, the signal processing circuitry 145 compares at least a portion of the color image to one or more reference color characteristics that are typical of artifacts of the type being detected. To aid the detection of artifacts of a given type in a color image, a reference color is predefined, selected, or computed having color characteristics that are typical of artifacts of the given type. To correct the artifact, the signal processing circuitry 145 modifies at least one of the color characteristics of the artifact obtaining a more desirable appearance.

The artifact correction system 110 can be incorporated into a single package, such as a digital camera, or in a combination of different devices, such as an image capture device and a separate software package on a computer for performing the digital processing. Furthermore, the image capture circuitry 160 and image processing system 120 may be contained within a single integrated chip. Of course, other variations of this design apparent to one of ordinary skill in the art, could be made to the image circuitry without departing from the essence of the invention. For example, the image processing system may be configured to operate automatically without any input from a user interface 170. This may be desirable where the entire image processing system is embodied inside a digital camera.

Figure 2:
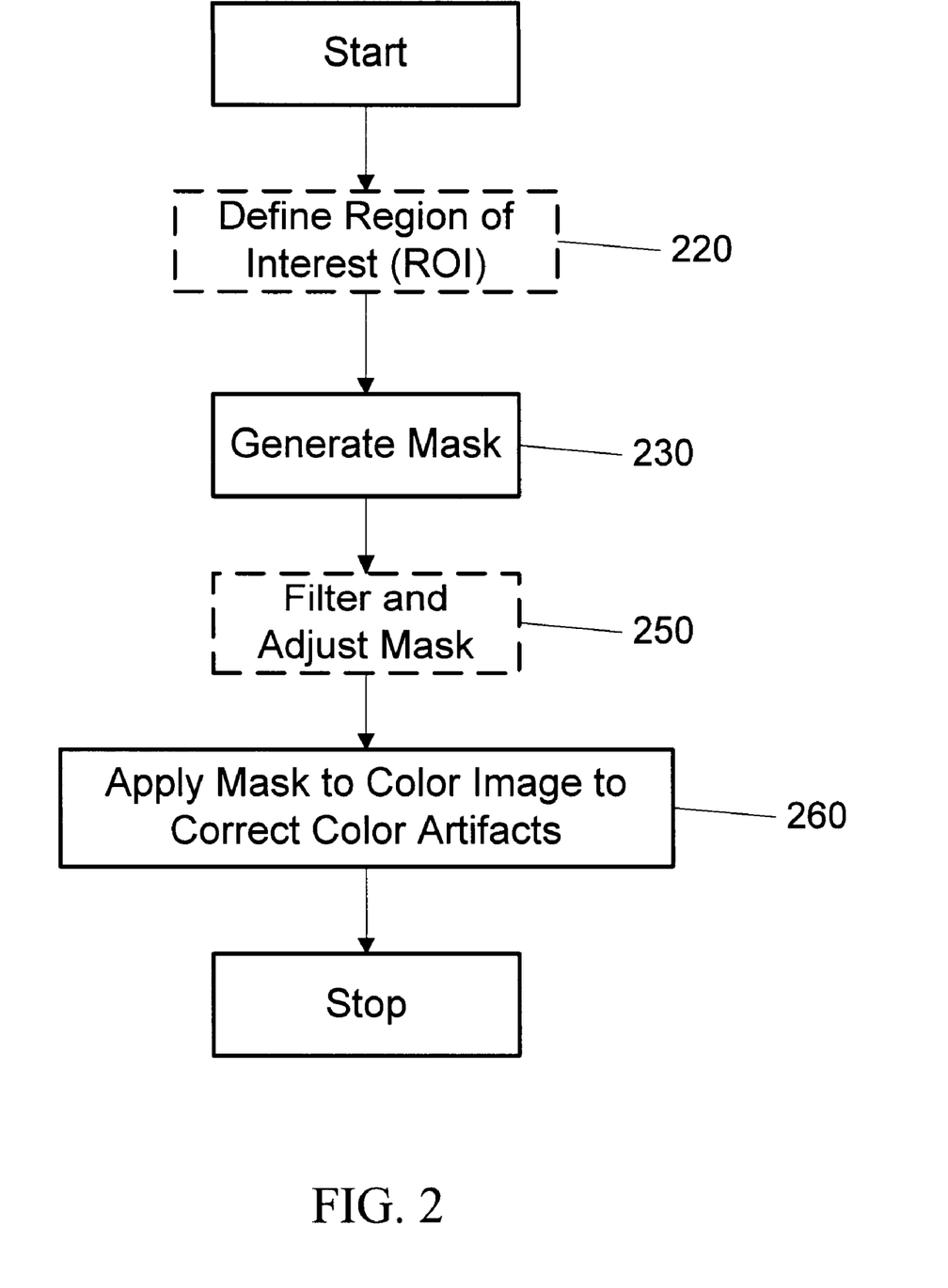
FIG. 2 is a flow chart illustrating a signal processing circuit for correcting artifacts in color images.

FIG. 2 is a flow chart illustrating the signal processing circuitry for correcting artifacts in color images. Optional functions for improving the accuracy or efficiency of the image detecting and correcting process or the finished look are illustrated with dashed lines. In the first block 220, a region of interest (ROI) is optionally defined. Defining a ROI reduces the amount of processing needed. It also reduces the probability that the artifact detection program will identify and modify portions of the, image that resemble reflected light artifacts (such as red eye) but that are not. A ROI may be defined manually by a user selecting a border around the portion of the color image containing one or more artifacts. The ROI may also be defined through automated methods, such as known neural network techniques for detecting faces and eyes.

In block 230, a mask is generated for the original color image (or the ROI) that identifies each pixel where the color difference between the pixel and the reference color exceeds one or more threshold values. The mask generation process may be accomplished by quantifying the color differences between the original color image (or the ROI) and the reference color corresponding to the red-eye artifact. These quantified values are then compared to one or more threshold values. The mask is used to identify those portions of original color image (or ROI, if one is provided) that contain one or more artifacts, for which correction is needed.

In block 250, the mask is optionally filtered and adjusted. When applied to remove red-eye artifacts from a color image, generating masks 230 will typically yield a mask containing one or more circular-shaped blobs. That is because the pupil of an eye, through which red light reflected by the eye's retina passes, is circular. However, other portions of the color image or ROI that are reddish may be falsely identified by the generated mask 230 as containing artifacts where correction is needed. By filtering and adjusting the mask, such as by morphological processing or blob analysis, incorrectly-identified mask elements are eliminated or at least minimized. Filtering and adjusting processes also facilitate the use of the mask to not only identify artifacts requiring correction, but also influence how the color characteristics of the artifacts are modified.

In block 260, the mask is applied to the color image to aid in the correction the artifacts. The mask identifies portions of the color image or ROI containing artifacts needing correction. One or more of the color characteristics of these artifacts are modified to correct the artifact and may result in a more desirable appearance. For example, to correct red-eye artifacts, the saturation of pixels representing red-eye artifacts is minimized, giving the pixel an achromatic appearance. To preserve the specular reflection of the eye, the luminance of a red-eye pixel is left substantially unchanged. The luminance, however need not be completely unaltered to preserve the specular reflection of the eye. Often, a more desirable appearance of the eye's pupil can be obtained by "contrast stretching" the masked portion of the image to make dark pixels darker. Contrast stretching increases the dynamic range of the gray or luminance levels in an image being processed.

FIGS. 3a–3e illustrate the operation of the functions of FIG. 2. The linings shown in the pictures represent color. Grid-lines represent gold or yellowish colors, such as that of the skin surrounding the eye. Horizontal lines represent the color blue, such as that of the iris. Vertical lines represent red or pink, such as a red-eye artifact, or the pinkish tinges near the lining of the eye. White represents white or light colors, such as the white of the eye or the specular reflection of the eye produced by a flash. Black represents black or dark gray. Finally, horizontal dashed lines represent moderate gray.

Figure 3A:
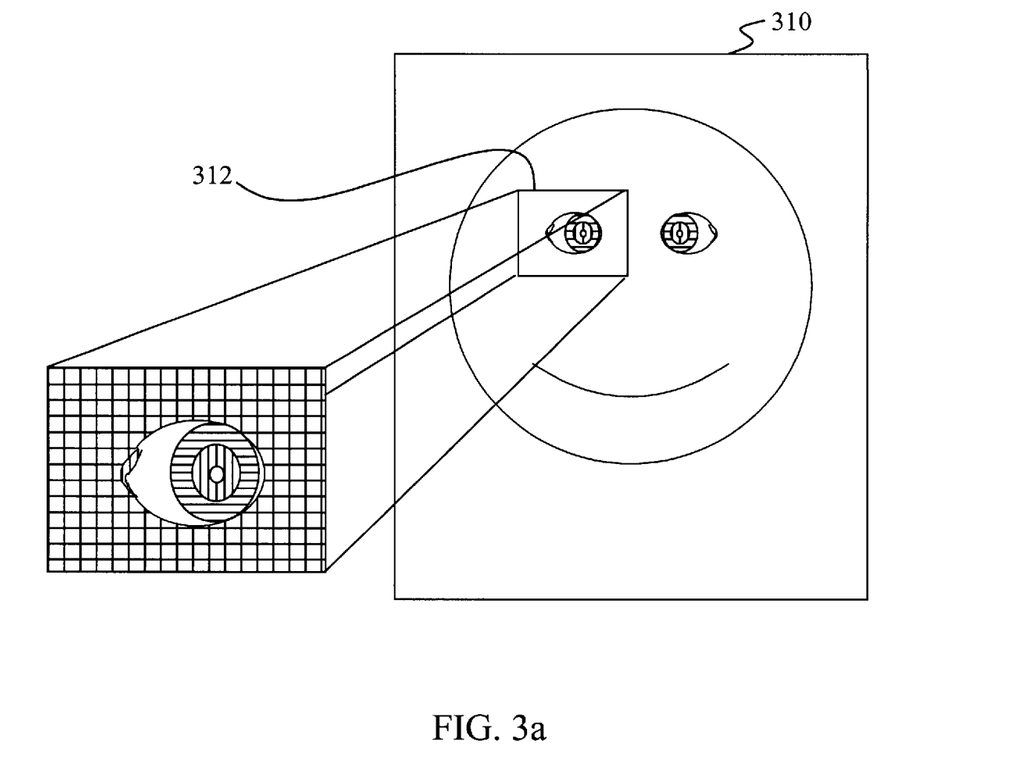
FIG. 3a is a projection diagram illustrating the selection of a region of interest from a picture of a face.

FIG. 3a is an exemplary image illustrating the selection of a ROI. Image 310 is shown with a box 312 selected around an eye.

Figure 3B:
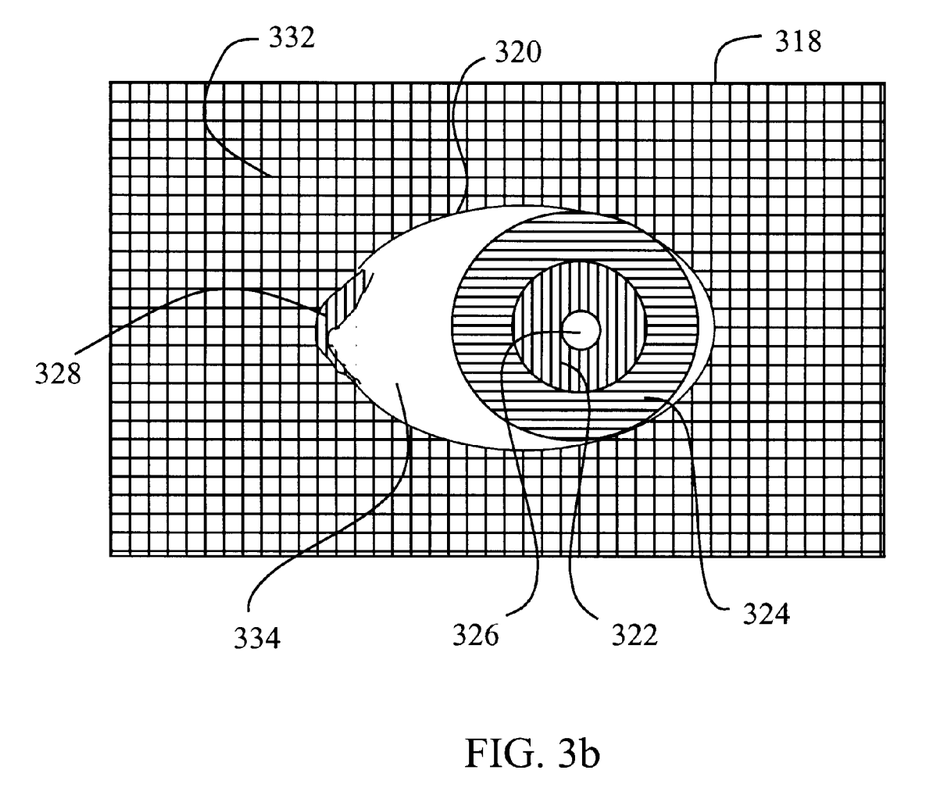
FIG. 3b is an image of an eye containing a red-eye artifact.

FIG. 3b is an exemplary image 318 of a portion of a face 332 containing an eye 320. The iris 324, the pupil 322, and a circular specular reflection 326 are illustrated as being blue, red, and white, respectively. Of course, it is desired that the pupil 322 be black. In the exemplary image, however, the pupil 322 is illustrated as red, as is typically seen in photographs containing red-eye artifacts. A pinkish portion 328 of the face, near the corner of eyeball 334, is also provided to illustrate a portion of an image for which the color red is not an artifact.

Figure 3C:
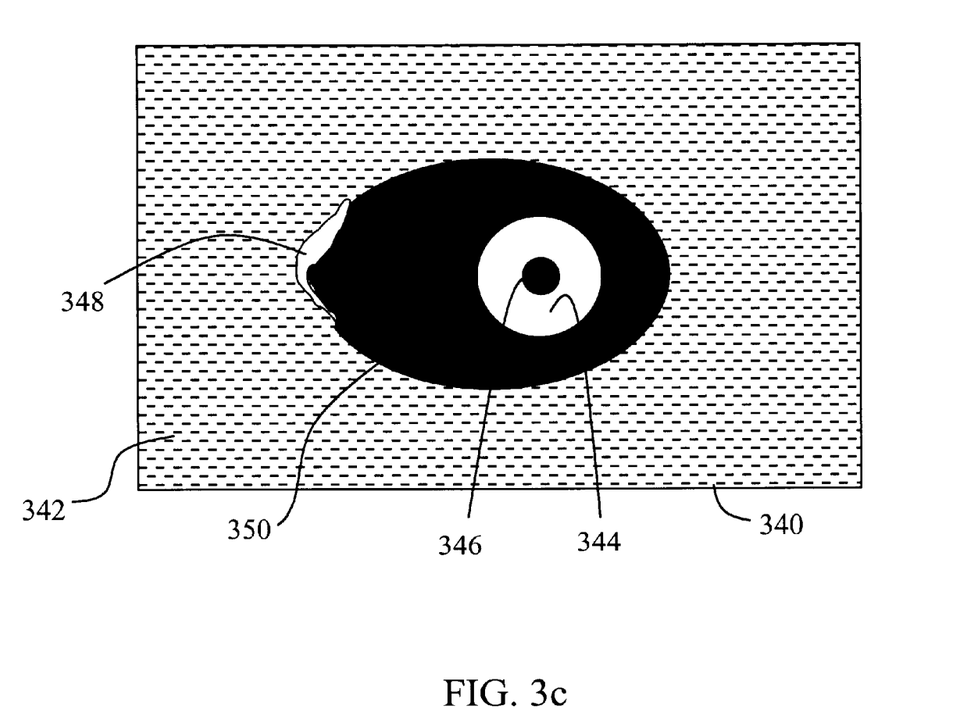
FIG. 3c is an image of a color difference mask of the image of FIG. 3b.
Figure 3D:
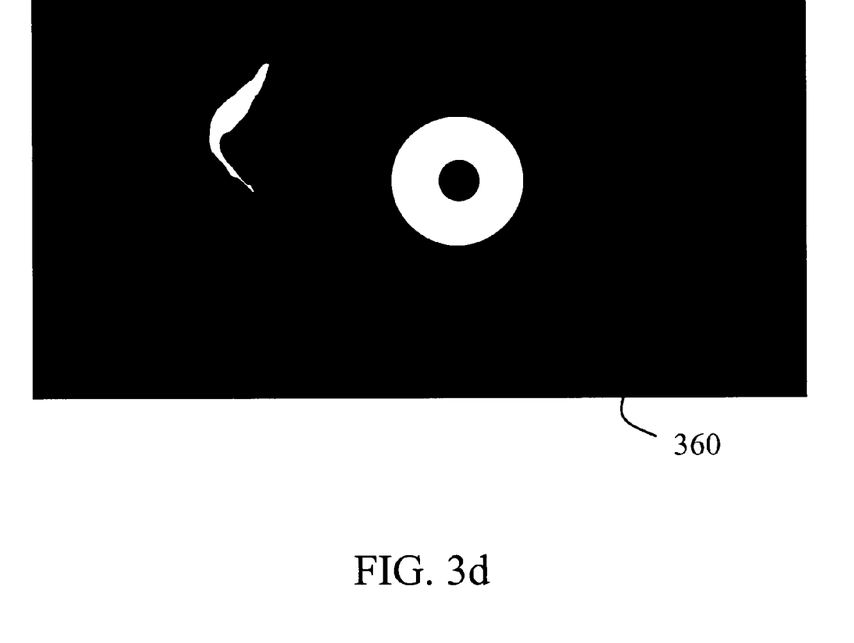
FIG. 3d is an image of a binary mask identifying red-eye artifacts in the image of FIG. 3b.

FIGS. 3c and 3d are exemplary images of masks generated to identify portions of the image containing artifacts.

FIG. 3c is a color difference mask 340 of the image 318 of FIG. 3b, representing a plurality of color difference values between the color image 318 and at least one characteristic of a red-eye reference color. The color difference mask 340 is a gray-scale mask, wherein the closer the color of a point on the original image is to the reference color, the lighter the corresponding point is in the color difference mask. As illustrated in FIG. 3c, the pupil 344 is white, and the specular reflection 346 and remainder of the eyeball 350 is dark gray or black. The face 342, with the exception of portion 348, is moderate gray, representing the closeness of the skin's slight pinkish tint to the red-eye reference color.

FIG. 3d is a binary, black-and-white mask 360 of the image 318, which identifies two areas potentially containing red-eye artifacts. The binary mask 360 is generated by applying a threshold function to the color difference mask 340 of FIG. 3c, to reduce the values represented therein to one of two values. Of course, the binary mask 360 is also derivable directly from the color image 318 without generating an intermediate color difference mask.

Figure 3E:
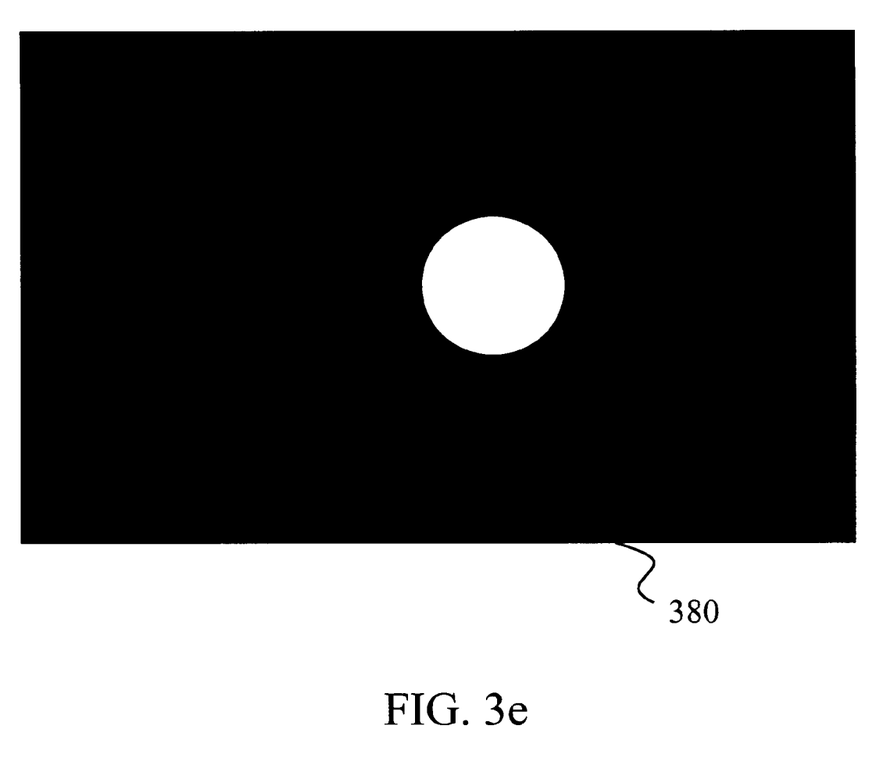
FIG. 3e is an image of a filtered mask identifying red-eye artifacts in the image of FIG. 3b.

FIG. 3e is a filtered mask 380 of the image of FIG. 3b, illustrating the application of various filtering operations, such as morphological and blob-analysis processes, on the mask of FIG. 3d. The filtering operations reduce false identifications of red-eye artifacts, thereby preserving portions of the image containing natural and desired red hues. The filtering operation also smoothes the mask, rendering the mask more suitable for correcting unwanted artifacts.

Figure 4:
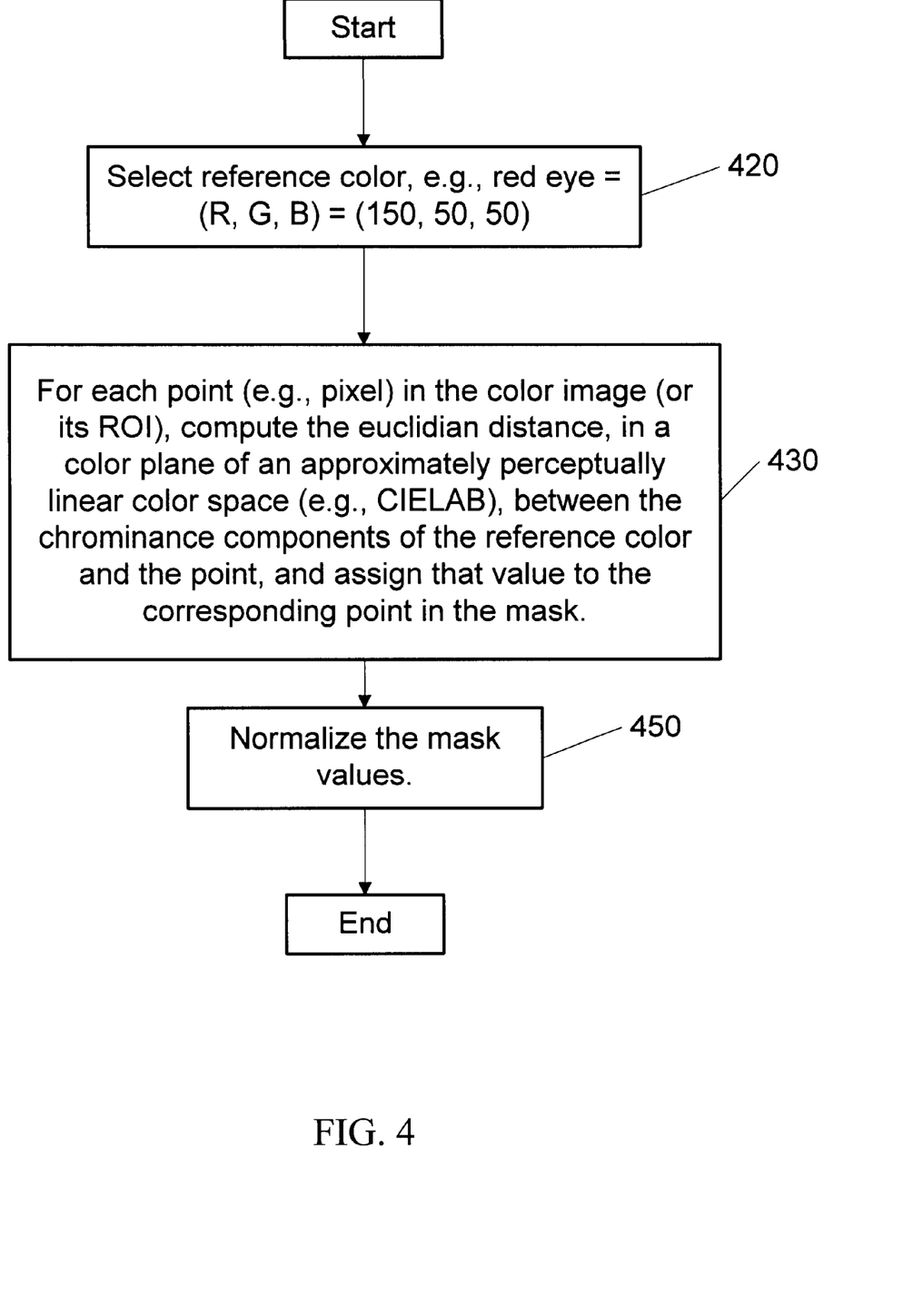
FIG. 4 is a flow diagram illustrating a process for generating a color difference mask.

FIG. 4 is a flow diagram illustrating one embodiment of a process for generating a color difference mask. In block 420 a reference color is selected. The reference color may be hard-coded, manually selected, or heuristically determined. In the illustrated embodiment, a reference color corresponding to the red-eye artifact is chosen having red, green, and blue components of 150, 50, and 50, respectively, on a scale of 0 to 255. Of course, a different reference color would be used to eliminate green- or gold-eye artifacts from pictures of animals.

The color space where the reference color is defined is not critical, but it is preferred that the reference color be defined in a color space that is or can be converted to an approximately perceptually linear color space, such as "CIELab." The acronym "CIELab" stands for a three-dimensional color space established by the Commission Internationale de l'Eclairage ("International Commission on Illumination"), with the letters L, a, and b representing the three orthogonal axes of the color space. The letter L, corresponding to the vertical axis of the color space, represents the luminance or intensity of the light. The letters a and b define the redness/greenness and the yellowness/blueness axes, respectively, of the color space.

In the CIELab color space, the hue of the color (i.e., dominant wave length) is represented as an angle and is determined by taking the arctangent of the quotient of the chromaticity components b and a, as in the formula: hue= arctan(b/a). The "chroma" of the color, which corresponds to the saturation or purity of the color (i.e., the extent to which the color is pure or comprised of light waves of substantially the same frequency, as opposed to white light, which is comprised of a mixture of spectral colors) is determined by taking the square root of the sum of the squares of chromaticity components a and b, as in the formula: chroma=$(a^2+b^2)^{1/2}$.

Typically, a color image received from image capture circuitry 160 (FIG. 1) will comprise a plurality of pixels having three additive color components—typically red, green, and blue. The signal processing circuitry 145 converts the pixel data of the ROI into the chrominance and luminance values of the CIELab color space or another approximately perceptually linear color space.

In block 430, for each point or pixel in the color image (or its ROI), a euclidean distance in a CIELab a-b color plane is computed between the chrominance of the pixel and the chrominance of the reference color, as illustrated by the following equation:

$$D_{l,c}=[(a_r-a_{l,c})^2=(b_r-b_{l,c})^2]^{1/2}$$

where $a_r$ and $b_r$ represent the chromaticity components of the reference color, $a_{l,c}$ and $b_{l,c}$ represent the chromaticity components of a pixel at line l, column c, and $D_{l,c}$ represents the colorimetric distance for the same pixel. As shown above, the differences between the luminance of the pixel and that of the reference color are not factored into the equation. Factoring out the luminance appears to have some advantage over calculating the three-dimensional euclidean distance between the reference color and the color image points, because the luminance of a red-eye artifact typically varies depending on the proximity and intensity of the flash.

Although calculating the colorimetric distance in a perceptually linear space after factoring out any differences in luminance is believed to be advantageous, colorimetric distances can be calculated in a variety of different ways. For example, the colorimetric distance can be calculated as a euclidian distance in the u-v plane of the "CIELuv" color space, which is a perceptually linear color space used to represent additive color systems. (CIELab color space is chiefly used to represent subtractive color systems.) The color distance can also be calculated as the three-dimensional euclidean distance in CIELab or CIELuv color space without factoring out the luminance component. Colorimetric distances may also be calculated in perceptually non-linear color spaces such as the RGB (red, green blue) or CMY (cyan, magenta, yellow) space.

After the colorimetric distances $D_{l,c}$ have been computed for each point or pixel in the difference mask, the colorimetric distances are normalized to values between 0 and 255, as illustrated in block 450 and shown in the following equation:

$$\text{Mask}(l,c) = 255 \cdot \left(1 - \frac{D_{l,c} - \text{MIN}(D_{l,c})}{\text{MAX}(D_{l,c}) - \text{MIN}(D_{l,c})}\right)$$

After normalization, the values 0 and 255 correspond to the maximum and minimum colorimetric distances, respectively, between the ROI and the reference color. Here, the normalization constant 255 is used assuming that a single byte is used to represent each pixel of the difference mask in integer form. Of course, a normalization factor should be used that corresponds to the range of values of $D_{l,c}$, the gray-scale resolution of the mask, and the format (e.g., short integer, long integer, floating-point number) in which the pixel values are stored.

Figure 5:
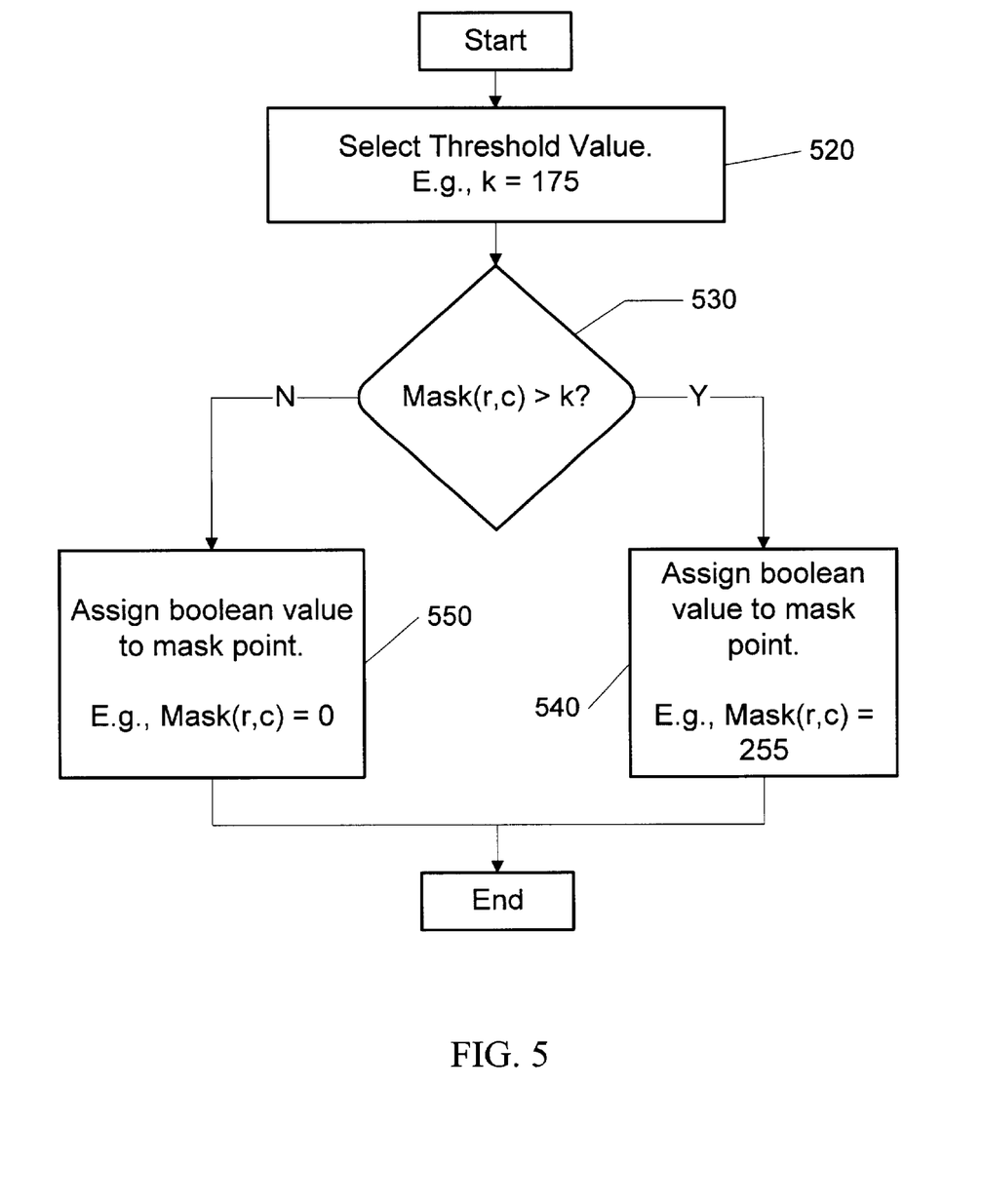
FIG. 5 is a flow diagram illustrating a process for generating a binary mask.

FIG. 5 is a flow diagram illustrating one embodiment of a process of generating a binary, black-and-white mask, using the color difference mask of FIG. 4. In block 520 a threshold value is selected. A hard-coded value 175 is selected assuming that the mask values have been normalized to values between 0 and 255. To the extent that the mask values have been normalized to different ranges, a threshold value should be selected within the corresponding range. While in the illustrative embodiment a hard-coded value is used, algorithms may be written to select a threshold value automatically using known thresholding techniques. Alternatively, the user may be given the power to manually select a threshold value.

In block 530, each pixel of the mask is compared to the threshold value. If the mask value is greater than the threshold value, a Boolean value, for example, 255, is assigned to that mask pixel, as shown in block 540. If the mask is less than or equal to the threshold value, then the opposite Boolean value, for example, 0, is assigned to the mask point, as shown in block 550. In this way, all of the mask values are reduced to one of two binary values.

Figure 6:
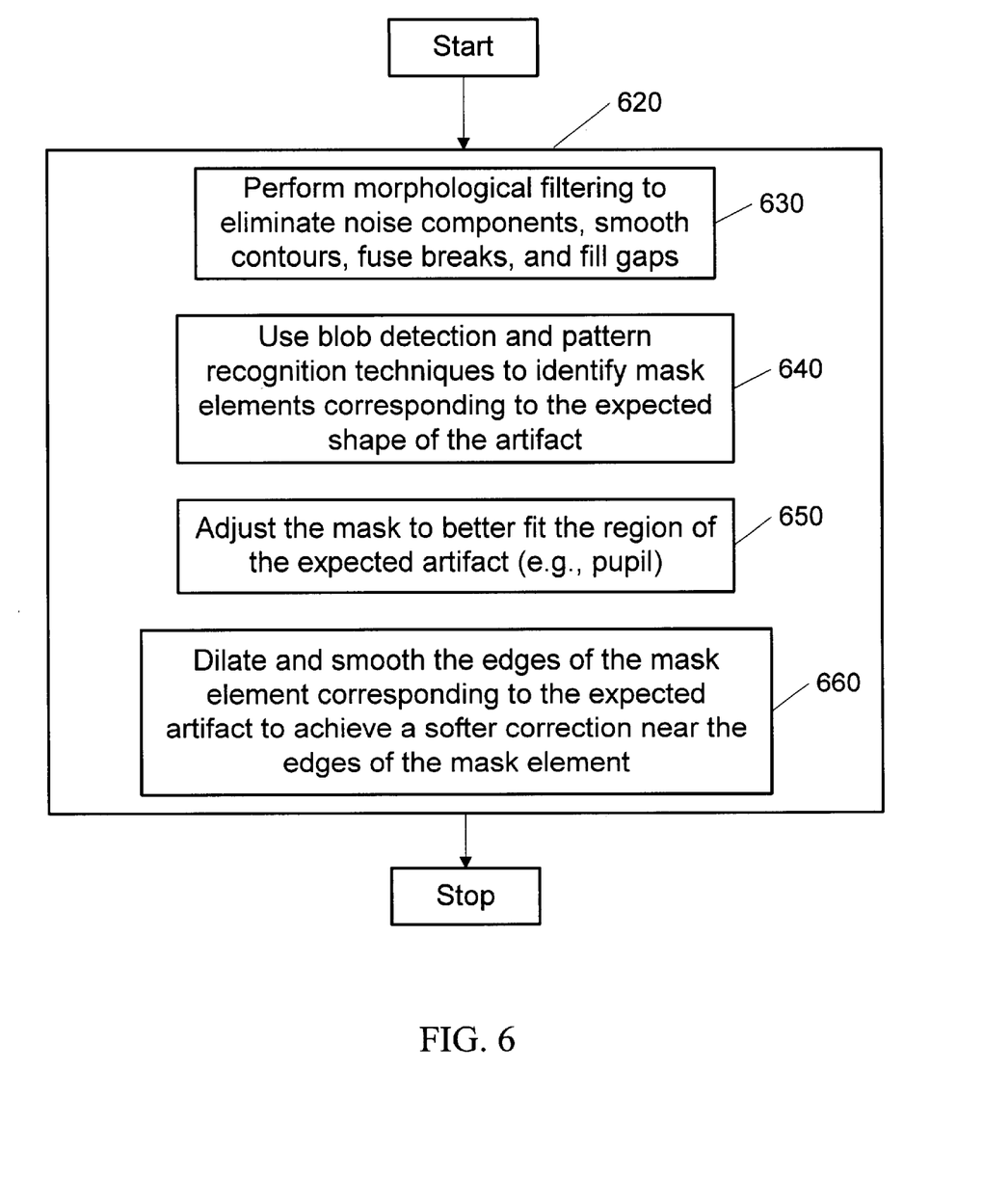
FIG. 6 is a flow diagram illustrating operations for filtering and adjusting the difference mask.

FIG. 6 is a flow diagram showing various operations that may used individually or in combination with each other, and in any order, to filter and adjust the mask. Box 620 contains four filtering and adjusting operations for the mask. In block 630, morphological filtering is done on the mask to eliminate noise components, smooth contours, fuse brakes, and fill gaps. In block 640, blob detection and pattern recognition techniques are used to identify "blobs" (i.e., groups) of contiguous pixels that correspond to the unwanted artifact. Blob detection can be performed using well-known connected-component detection and extraction techniques.

After a complete set of blobs or connected components have been detected, the particular blob or blobs corresponding to the artifact are selected, and the remainder eliminated from the mask. If the artifact to be removed corresponds to the red eye artifact, a pattern recognition routine should be used to choose the blob that is most circular in shape, and that is not too small. For example, the pattern recognition routine may choose from among those blobs having a size at least 1/20th of the size of the ROI, the blob having a width-to-height ratio nearest to 1.

Red-eye artifacts generally have a substantially circular shape because the pupil is circular. Red-eye artifacts, however, are not always round. The shape of the artifact depends on a variety of factors, including image resolution, eye and eyebrow position, flash power, imaging geometry, and any image processing steps (e.g., film exposure, development, scanning, and color correction) that have taken place along the way. Therefore, more sophisticated pattern recognition techniques can be used to detect red eye of less circular shapes.

Continuing with FIG. 6, in block 650, the mask is adjusted to better fit the region of the expected artifact. The blob or blobs remaining in the mask after the blob detection and pattern recognition routines of block 640 may somewhat imprecisely mask the image's actual artifacts. In the application of red-eye detection and correction, for example, a rather conservative threshold is typically selected to identify red-eye artifacts in block 520 (FIG. 5), in order to exclude pinkish skin and reddish regions near the corner of the eye. Such a threshold, however, often does not adequately detect the entire region of a red-eye artifact. Once a red-eye artifact has, through the application of the morphological, blob analysis, and pattern recognition operations of blocks 630 and 640, been more confidently identified, the color difference mask of FIG. 4 is binarized again, using a less conservative threshold. This results in a larger blob that more precisely corresponds to the red-eye artifact. This second threshold application is particularly appropriate for red-eye correction because the red-eye should be substantially surrounded by the non-red iris.

An alternative adjustment routine for block 650, requiring less processing, is to replace an identified red-eye artifact blob with a circular blob having a center corresponding to the center of the blob and a diameter equal to the greater of the blob's height and width.

In block 660, the edges of the mask element corresponding to the expected artifact are dilated and smoothed in order to achieve a softer correction near the edges of the mask element. Prior to the smoothing operation, the mask pixels are limited to two values, corresponding to black and white. The smoothing introduces intermediate gray levels back into the mask, so that the edges of the blob corresponding to the red-eye artifact have varying shapes of gray. The gray levels moderate the extent to which various color characteristics of corresponding pixels in the original image are modified to correct the red-eye artifact. The dilation and smoothing operations help achieve a more natural look and smoother transition between the original image and the corrected portions of the image.

Figure 7:
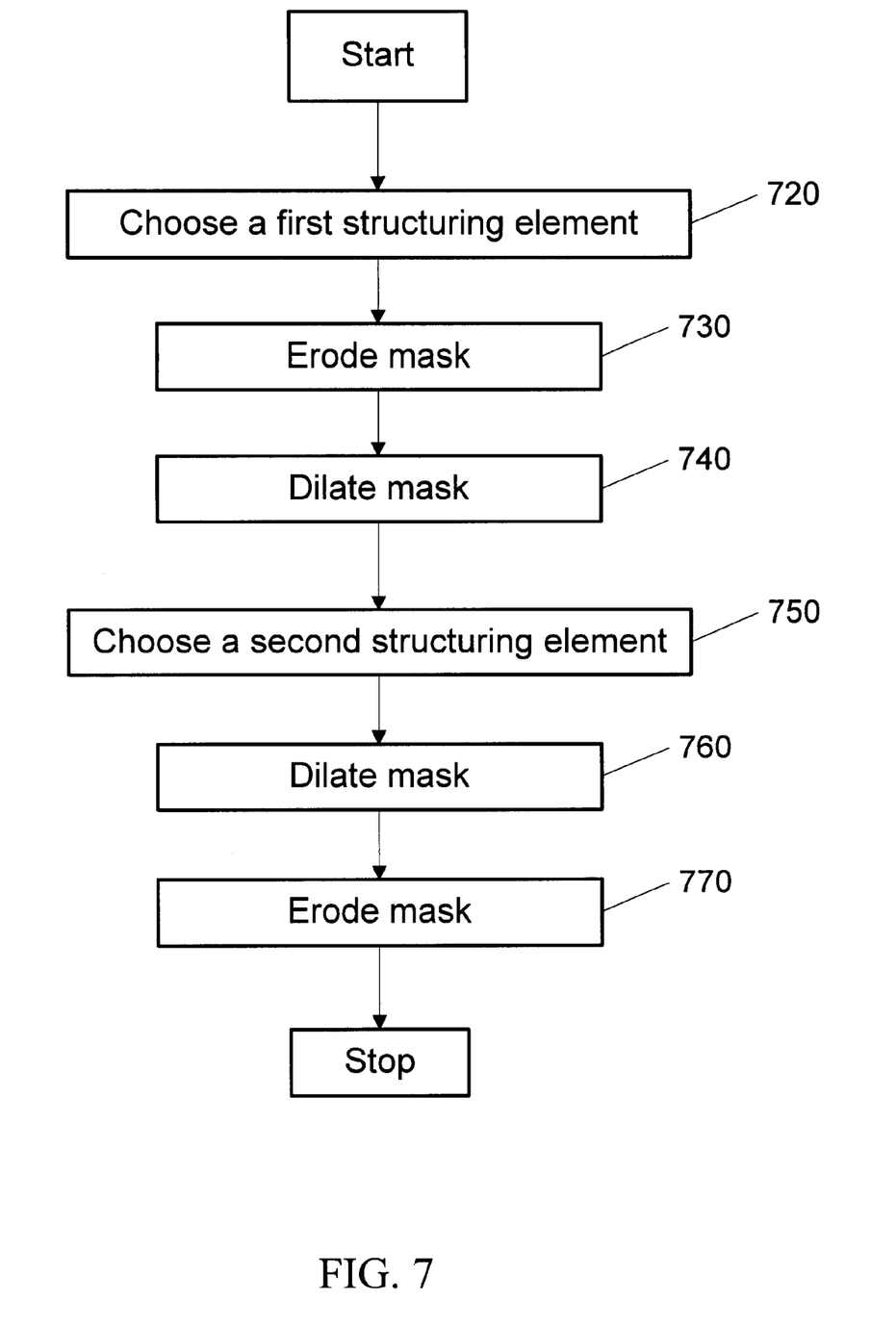
FIG. 7 is a flow diagram of a morphological filtering operation for eliminating noise components, smoothing contours, and filling gaps in a binarized color difference mask.

FIG. 7 is a flow diagram of a morphological filtering operation intended to eliminate noise elements, smooth contours and fill gaps. FIG. 7 is an exemplary embodiment of block 630 of FIG. 6. In step 720 of the exemplary embodiment, a structuring element having a square shape with sides equal to 1/30 of the width of the ROI is selected to perform two initial morphological operations. In step 730 the mask is eroded, and in step 740, the mask is dilated, both using the structuring element of 720. Application of steps 730 and 740, in that order, is commonly known as an "opening" operation. The opening operation smooths the contours of the image, breaks narrow isthmuses, and eliminates thin protrusions.

In step 750, a second structuring element, having a shape of a square with sides of approximately 1/10 of the width of the ROI, is selected. In step 760, the mask is dilated, and in step 770, the mask is eroded, both using the second structuring element. Application of steps 760 and 770, in that order, is commonly known as a "closing" operation. The closing operation smoothes sections and contours, fuses narrow breaks in long thin gulfs, eliminates small holes, and fills gaps in contours. Other shapes and sizes of structuring elements could be used, and other combinations of morphological operations could be used, to filter the mask without departing from the essence of the invention.

Figure 8:
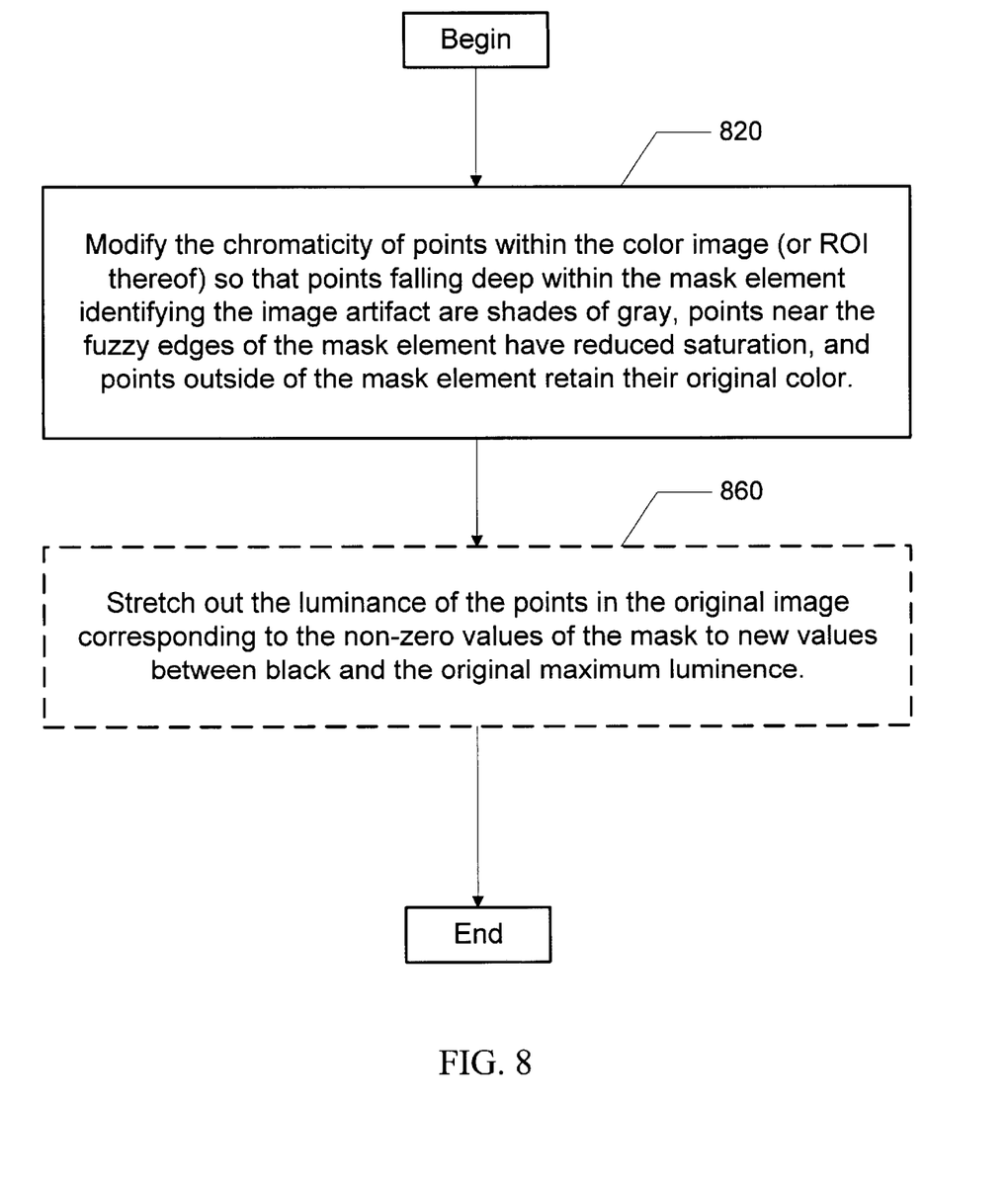
FIG. 8 is a flow diagram illustrating a process applying a mask to a color image to correct image artifacts.

FIG. 8 is a flow chart illustrating one embodiment of a process used to apply the mask to the original image to correct the artifacts. In step 820, the pixels within the color image corresponding to the white portions of the mask are changed to shades of gray. In other words, the saturation of each of these pixels is changed to zero. The saturation of pixels corresponding with gray portions of the mask is reduced, but not eliminated altogether. Pixels corresponding with black portions of the mask retain their original color.

There are a variety of ways to accomplish step 820, but in the illustrative embodiment, this is done by converting the color of each pixel within the color image to the CIELab color space and changing the chromaticity components a and b in accordance with the following equations:

$$a_{l,c} = a_{l,c} \cdot \left(1 - \frac{\text{Mask}(l, c)}{255}\right)$$

-continued $$b_{l,c} = b_{l,c} \cdot \left(1 - \frac{\text{Mask}(l, c)}{255}\right)$$

In step 860 the luminance of each pixel of the original image is stretched out. This is not required but tends to improve the look of the eye. In the illustrative embodiment, the luminance is stretched out so that the maximum luminance value—which likely corresponds to pixels showing a specular reflection—is retained, but the minimum luminance value—which typically corresponds to the dark pupil of the eye—is stretched out to black. This process, known as "contrast stretching," is accomplished through the following equation:

$$L_{l,c} = (L_{l,c} - \text{MIN}(L_{l,c})) \cdot \left(\frac{\text{MAX}(L_{l,c})}{\text{MAX}(L_{l,c}) - \text{MIN}(L_{l,c})}\right) \cdot \left(\frac{Mask(l, c)}{255}\right) + L_{l,c} \cdot \left(1 - \frac{Mask(l, c)}{255}\right)$$

where $L_{l,c}$ is the luminance of a pixel at line l and column c; $\text{MAX}(L_{l,c})$ is the luminance of the brightest pixel in the color image corresponding to the nonzero portion of the mask; and $\text{MIN}(L_{l,c})$ is the luminance of the darkest pixel in the color image corresponding to the nonzero portion of the mask, or 20 on a scale of 0 to 100, whichever is greater. If application of the above equation results in a negative luminance value, then the luminance value for the corresponding pixel is set to zero.

In the exemplary embodiment, the color-correction equations used in this invention are applied only to pixels in the ROI corresponding to nonzero portions of the mask, and that have a chroma of greater than 20 in the CIELab color space and a hue of between negative 45 degrees and positive 65 degrees. Of course, other values and other mathematical manipulations could be used without departing from the essence of the invention.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

I claim:

1. An artifact correction system that corrects an artifact having a plurality of color characteristics comprising:
   image capture circuitry that captures a color image;
   signal processing circuitry that receives the color image from the image capture circuitry, compares at least a portion of the color image to at least one reference color characteristic to identify the artifact, and modifies at least one of the plurality of color characteristics of the artifact;
   memory that stores the color image in its raw and processed states; and
   wherein the signal processing circuitry compares the plurality of color difference values between at least a portion of the color image and the at least one reference color characteristic to at least one threshold value to compute a mask representing a plurality of pixels, where each pixel is represented by one of only two discrete end values, a plurality of pixel blobs are created having common values, the artifact has an expected pattern, the signal processing circuitry performs morphological, blob-detection, and pattern-recognition operations on the mask to select an artifact-identifying blob out of the plurality of pixel blobs corresponding to the expected pattern of the artifact, the artifact-identifying blob of the mask has a periphery, the signal processing circuitry performs a smoothing operation on the artifact-identifying blob to introduce a plurality of intermediate values to the mask along the periphery of the artifact-identifying blob, and the signal processing circuitry modifies the at least one of the plurality of color characteristics of the artifact in proportion to the end values and intermediate values that represent the pixels of the mask.

2. The artifact correction system of claim 1, wherein the at least a portion of the color image comprises a plurality of pixels having three additive color components; where the signal processing circuitry transforms the three additive color components of the pixels into chrominance and luminance components of an approximately perceptually linear color space; and where the signal processing circuitry modifies the chrominance components of the artifact to make the artifact substantially achromatic.

3. The artifact correction system of claim 1, further comprising a camera that houses the image capture circuitry.

4. The artifact correction system of claim 3, wherein the camera further houses the signal processing circuitry.

5. The artifact correction system of claim 1, wherein the signal processing circuitry computes a plurality of color difference values between the at least a portion of the color image and the at least one reference color characteristic to identify the artifact.

6. The artifact correction system of claim 5, wherein the color difference values represent qualitative color differences in a color plane of an approximately perceptually linear color space.

7. The artifact correction system of claim 1, wherein the signal processing circuitry computes a mask representing a plurality of color difference values between the at least a portion of the color image and the at least one reference color characteristic, to identify the artifact.

8. An image processing system that corrects an artifact having a plurality of color characteristics, in a color image, comprising:
   signal processing circuitry that compares at least a portion of the color image to at least one reference color characteristic to identify the artifact, and modifies at least one of the plurality of color characteristics of the artifact to correct the artifact; and
   wherein the signal processing circuitry compares a plurality of color difference values between at least a portion of the color image and the at least one reference color characteristic to at least one threshold value to compute a mask representing a plurality of pixels, where each pixel is represented by one of only two discrete end values, a plurality of pixel blobs are created having common values, the artifact has an expected pattern, the signal processing circuitry performs morphological, blob-detection, and pattern-recognition operations on the mask to select an artifact-identifying blob out of the plurality of pixel blobs corresponding to the expected pattern of the artifact, the artifact-identifying blob of the mask has a periphery, the signal processing circuitry performs a smoothing operation on the artifact-identifying blob to introduce a plurality of intermediate values to the mask along the periphery of the artifact-identifying blob, and the signal processing circuitry modifies the at least one of the plurality of color characteristics of the artifact in proportion to the end values and intermediate values that represent the pixels of the mask.

9. The image processing system of claim 8, wherein the signal processing circuitry computes a plurality of color difference values between the at least a portion of the color image and the at least one reference color characteristic to identify the artifact.

10. The image processing system of claim 8, wherein the artifact is a red-eye artifact caused by absorption of visible light by the retina of an eye.

11. The image processing system of claim 8, wherein the signal processing circuitry computes a mask representing a plurality of color difference values between at least a portion of the color image and the at least one reference color characteristic to identify the artifact.

12. The image processing system of claim 11, wherein the signal processing circuitry compares the plurality of color difference values to at least one threshold value to identify the artifact.

13. The artifact correction system of claim 11, wherein the signal processing circuitry performs morphological and blob-detection operations on the mask to identify the artifact with greater accuracy.

14. A method for correcting an artifact, having a plurality of color characteristics in a color image comprising:

comparing at least a portion of the color image to at least one reference color characteristic to identify the artifact;

modifying at least one of the plurality of color characteristics of the artifact;

comparing a plurality of color difference values between at least a portion of the color image and the at least one reference color characteristic to at least one threshold value to compute a mask representing a plurality of pixels, where each pixel is represented by one of only two discrete end values;

creating a plurality of pixel blobs having common values, where the artifact has an expected pattern;

performing morphological, blob-detection, and pattern-recognition operations on the mask to select an artifact-identifying blob out of the plurality of pixel blobs corresponding to the expected pattern of the artifact, the artifact-identifying blob of the mask has a periphery;

performing a smoothing operation on the artifact-identifying blob to introduce a plurality of intermediate values to the mask along the periphery of the artifact-identifying blob; and modifying the at least one of the plurality of color characteristics of the artifact in proportion to the end values and intermediate values that represent the pixels of the mask.

15. The method of claim 14, further comprising computing a mask representing a plurality of color difference values between the at least a portion of the color image and the at least one reference color characteristic to identify the artifact.

16. The method of claim 14, further comprising computing color difference values in an approximately perceptually linear color space between the at least one reference color characteristic and the at least a portion of the color image, where the at least one reference color characteristic is represented in the color space.

17. The method of claim 14, further comprising computing a plurality of color difference values between the at least a portion of the color image and the at least one reference color characteristic, and comparing the plurality of color difference values with at least one threshold value to create a mask that identifies the artifact.

* * * * *